J. H. WINSLOW.
Cake-Cutter.

No. 164,667.          Patented June 22, 1875.

UNITED STATES PATENT OFFICE.

JAMES H. WINSLOW, OF LYNN, MASSACHUSETTS, ASSIGNOR OF TWO-THIRDS HIS RIGHT TO MAY & WITHEY, OF SAME PLACE.

IMPROVEMENT IN CAKE-CUTTERS.

Specification forming part of Letters Patent No. 164,667, dated June 22, 1875; application filed April 14, 1875.

*To all whom it may concern:*

Be it known that I, JAMES H. WINSLOW, of Lynn, in the county of Essex, State of Massachusetts, have invented a certain new and useful Improvement in Cake-Cutters, of which the following description is sufficiently full, clear, and exact to enable any person skilled in the art or science to which my invention appertains to make and use the same, reference being had to the accompanying drawing, forming a part of this specification, in which—

Figure 1:
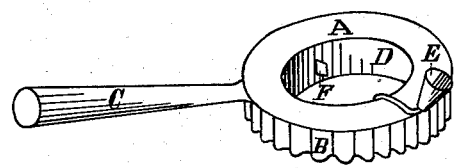
Figure 2:
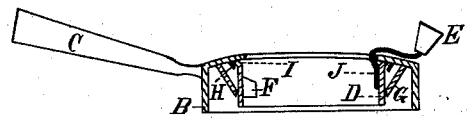

Figure 1 is an isometrical perspective view, and Fig. 2 a vertical section.

Like letters of reference indicate corresponding parts in the different figures of the drawing.

My invention relates to that class of culinary implements which are used in cutting tarts, and consists in a novel construction and arrangement of the parts, as hereinafter more fully set forth and claimed, by which a simple, cheap, and effective device of this character is produced.

It is well known, by all conversant with such matters, that in the manufacture of tarts the dough or pastry forming the crusts is usually made separately, the upper crust or rim of the tart being cut in the form of a ring and afterward placed upon the lower crust or bottom of the tart preparatory to baking and filling with the jelly. This method, however, is slow and laborious, it being difficult to place the rim or upper crust upon the lower crust rapidly, and in a manner to produce a perfectly formed article.

My invention is designed to obviate this difficulty, and to that end I make use of a cutter constructed in a manner which will be readily understood by the following description:

In the drawing, A is the body of the cutter having a circular opening in the top, and provided with the handle C, and ordinary annular cutting flange or knife B.

Within the body of the cutter there is an auxiliary circular knife or cutter, D, having its upper edge bent outwardly, as at I, and so arranged as to be easily rotated laterally in the ways H, which project from the body A by means of the handle E. The cutter D is not so deep or wide as the knife B, and between it and the knife B there is arranged a presser, G, which is in the form of a hollow conical frustum, inverted and secured by its base to the interior of the top of the body A.

Projecting laterally from the side of the vertical opening through the cutter D there is a fin or clearer, F, as shown, which does not extend quite to the bottom of the cutter.

In the use of my improved cutter the dough or pastry is rolled and dredged in the usual manner, the crusts being arranged for cutting by placing two layers or thicknesses together, one above the other. The handle C is then grasped in one hand and the handle E in the other, the knife B being forced down through both thicknesses of crust, and the knife or cutter D through the upper crust only, the fin F passing partially through one edge of the ring thus cut from the upper crust. The cutter D is now rotated or moved rapidly back and forth by the handle E, detaching the piece cut from the upper crust by means of the fin, and enabling it to be readily removed from the cutter through the opening in the top.

The object of the cone G is to press the interior edge of the upper crust or rim toward the outside of the tart as the cutter descends, and thus give it a better form, and also to enable the cutter to be more readily detached after the operation.

It will be obvious that the knife B may be corrugated or plain; also, that the cutter will not only cut the upper and lower crust simultaneously, but also at the same time cut out the center of the upper crust to receive the jelly or preserve which usually enter into the composition of the tart.

Having thus described my invention, what I claim is—

1. In a cake-cutter, substantially such as described, the knife D, provided with the handle E, arranged to operate substantially as and for the purpose specified.

2. In a cake-cutter, substantially such as described, the pin F, in combination with the knife D, and handle E, substantially as and for the purpose set forth.

3. In a cake-cutter, substantially such as described, the knives B D and presser G, combined to operate substantially as and for the purpose stated.

JAMES H. WINSLOW. [L. S.]

Witnesses:
A. F. L. NORRIS,
T. L. NORRIS.